Patented Jan. 30, 1951

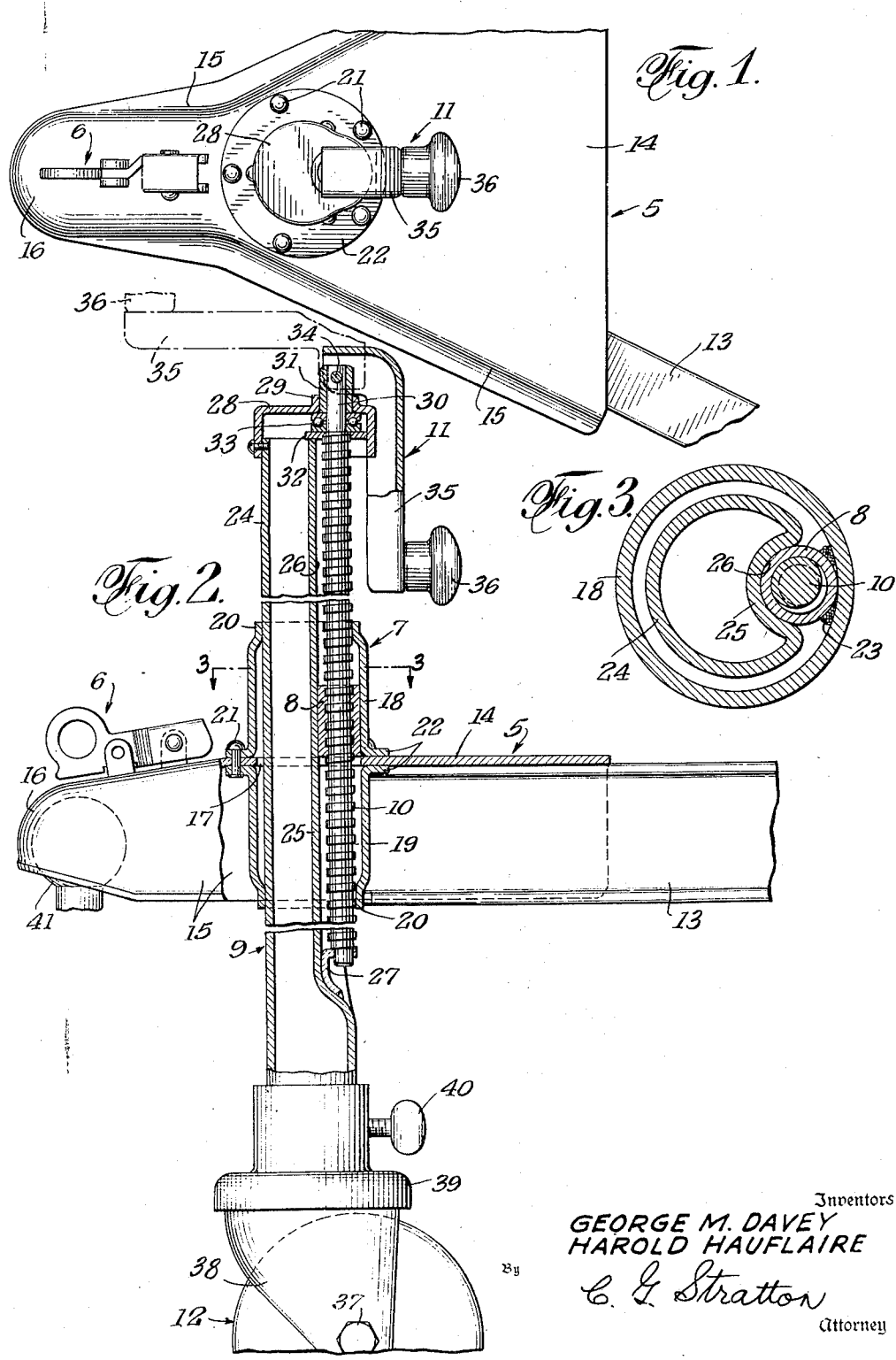

2,539,897

UNITED STATES PATENT OFFICE 2,539,897

HITCH JACK

George M. Davey, Downey, and Harold Hauflaire, Glendale, Calif., assignors to Hadco Engineering Company, Huntington Park, Calif., a corporation of California Application May 15, 1948, Serial No. 27,184

9 Claims. (Cl. 254—86)

This invention relates to a jack for trailers and like vehicles for the two-fold purpose of supporting said trailer when at rest and disconnected from its towing vehicle and for raising and lowering the tail or rear end of said trailer during the operations of connecting the same to and disconnecting from the towing vehicle.

An object of the present invention is to provide a jack that is convenient in use and effective to function in the manner above stated.

Another object of the invention is to provide a hitch jack that is unitary and is adapted to be readily affixed to a trailer or like vehicle.

Another object of the invention is to provide a hitch jack structure that embodies a column adjustable with respect to a base or support plate and further includes a screw and nut so associated with the column that the latter is readily adjusted longitudinally while held against rotation by the nut.

A further object of the invention is to provide a hitch jack, as above, in which a caster wheel is carried by the lower end of the jack so that the rear end of the trailer can be readily swung to a desired position with a minimum of effort.

A still further object of the invention is to provide a hitch jack, as above, in which the operating means is foldable to a non-projecting position when out of use and is yet readily available for use.

Our invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes one embodiment of the present invention, which is given by way of illustration or example only.

In the drawings, like reference characters designate similar parts in the several views.

Fig. 1 is a broken plan view of a hitch jack according to the present invention.

Fig. 2 is a broken longitudinal sectional view thereof.

Fig. 3 is an enlarged cross-sectional view as taken on line 3—3 of Fig. 2.

That embodiment of the hitch jack which is illustrated comprises, generally, a top mounting plate 5, hitch ball connector means 6, carried by said plate, a vertically disposed guide 7 extending through the plate, and embodying a jack nut 8, a jack shaft 9 vertically adjustable in said guide and mounting a jack screw 10 that operates in said nut, foldable handle means 11 for rotating the jack screw, and a caster wheel 12 on the lower end of the jack shaft for engagement with the ground.

The trailer or like vehicle is conventionally provided with a forwardly extending triangular frame of which the channel member 13 is one leg. The present jack is mounted on and secured to said frame in the usual manner by bolts or welds whereby the plate 5 becomes part of the frame and strengthens it.

The plate 5 is provided with a top wall 14, with integrally formed side walls 15 that are arranged at an angle to each other to suit the angle of the elements 13 of the frame, and a hitch ball-receiving socket end 16 joining the side walls 15 and the top wall 14 at the front end of the top plate.

The connector means 6 that is illustrated does not comprise part of the present disclosure and is shown primarily for the purpose of revealing the utility of the top plate and also to show the environment of the instant jack. Accordingly, the connector means 6 may be varied.

The guide 7 is arranged to be vertical or perpendicular to top wall 14 of plate 5. The same is centered on an opening 17 in said wall and comprises two similar tubular housing members 18 and 19—one extending upwardly from wall 14 and the other downwardly therefrom. The housing members 18 and 19, each at the outer end thereof, is restricted at 20 to thereby provide spaced guide portions that engage and guide the jack shaft 9. A suitable number of rivets 21 extend through flanges 22 formed on each tubular housing member and through wall 14 to effect rigid and permanent aligned assembly of the former to the latter.

The nut 8 is internally threaded and comprises a member that is welded, as at 23, to the inner face of either member 18 or 19. As best seen in Fig. 3, said nut is carried eccentrically of the axis of the guide and comprises part thereof.

The jack shaft 9 comprises a tube 24 of a diametral size to extend and move freely through guide 7. The upper portion of said tube, and extending short of the bottom thereof, is formed with an indented longitudinal wall part 25 that is formed to have sliding engagement with the nut 8 and also keying engagement therewith whereby the tube is non-rotationally guided by said nut.

The jack screw 10 resides in the longitudinal groove or channel 26 that is formed by indented tube part 25, is operatively engaged with the nut and is supported at its lower end by a bracket 27 welded to the jack tube substantially as shown. All parts of the jack screw and said bracket reside within the outer diameter of the jack tube so that the same will readily move through the restricted guide parts 20 of the guide. By means of the above-described construction, large and well spaced bearings are provided for the jack shaft whereas the jack screw is of relatively small diametral size with attending economy of manufacture.

The upper end of the jack shaft 24 is fitted with a closure cap 28 that has an eccentric passage 29 for the upper end 30 of the jack screw, a bushing 31 being provided on the latter. The cap 28 is fixed in place and between the same and a plate 32 resting on the top end of the jack shaft 20 there is provided a thrust bearing 33 that takes the thrust of the jack screw and thereby eases the rotation thereof.

The handle means 11 is carried by end 30 of the jack screw and serves to effect rotation thereof. A pivot pin 34 intersects said end 30 and the bushing 31 thereon and serves to mount a handle 35 that has a knob 36. From Fig. 2 it will be seen that said handle 35 has a normal position on the rearward side of the jack shaft and parallel thereto and is thus out of the way. When operation of the jack is desired, the handle is swung upwardly on pivot 34 to the dot-dash line position so that it may be employed as a crank to rotate the jack screw. Said handle, after such use, is folded back to its original position.

The caster wheel 12 is mounted on an axle between wheel brackets 38 that are integrally formed and mounted within a radial bearing in housing 39. The latter is formed as part of a sleeve or tube 39 that is fastened, as by a thumb screw 40, to the lower end of the jack shaft.

The use of the jack above described should be clear from the description thereof. Said jack can be used, as hereinbefore indicated, to so adjust the socket part 16 of the top plate with respect to a hitch ball 41 on a towing vehicle, as to facilitate connection to or disconnection from said hitch ball simply by suitable operation of the jack screw. Also, after such disconnection, the jack can be adjusted to level the chassis of the trailer. Although the trailer is firmly balanced by the caster wheel, the same is yet easily adjusted to a desired position on the ground.

While we have illustrated and described what we now regard as the preferred embodiment of our invention, the construction is, of course, subject to modification without departing from the spirit and scope of our invention. We, therefore, do not wish to restrict ourselves to the particular form of construction illustrated and described, but desire to avail ourselves of all modifications that may fall within the scope of the appended claims.

Having thus described our invention, what we claim and desire to secure by Letters Patent is:

1. A hitch jack comprising a mounting plate, a tubular guide extending through said plate, a jack nut fixed within said guide and eccentric thereof, a jack shaft, a jack screw alongside of the jack shaft and carried at its end by said shaft both the shaft and screw extending through said guide and only the screw extending through the nut, and an operating handle on one end of the jack screw.

2. A hitch jack comprising a mounting plate, a tubular guide extending through said plate, a jack nut fixed within said guide and eccentric thereof, a jack shaft, a jack screw alongside of the jack shaft and carried at its end by said shaft both the shaft and screw extending through said guide and only the screw extending through the nut, and a pivoted operating handle on one end of the jack screw and adapted to extend alongside of and substantially parallel to the jack shaft in non-operative position and to extend substantially at right-angles to said shaft in operative position.

3. A hitch jack comprising a mounting plate, a tubular guide extending through said plate, a jack nut fixed within said guide and eccentric thereof, a jack shaft extending through the guide and longitudinally indented to provide a longitudinal channel, a jack screw carried by the shaft and residing in said channel, said screw extending through the jack nut, and an operating handle on one end of the jack screw.

4. A hitch jack comprising a mounting plate, a tubular guide extending through said plate, said guide comprising similar tubular members one extending from each face of said mounting plate, a jack nut fixed within said guide and eccentric thereof, a jack shaft extending through the guide, a jack screw carried by opposite ends of the shaft and extending alongside of said shaft and through the nut and tubular guide, and an operating handle on one end of the jack screw.

5. A hitch jack adapted to be fixedly mounted on the front extension frame of a trailer or like vehicle, said jack comprising a mounting plate having a top wall, a guide extending through said wall and comprising a pair of aligned similar tubular members each having a base flange and said flanges being connected together through said wall, the outer end of each tubular member being restricted, a jack shaft extending through said guide and having guiding engagement for longitudinal movement with said restricted outer ends, and means eccentric of the axis of the guide and jack shaft for adjusting the latter axially, said means comprising an internally threaded nut affixed to one point of the inner face of one guide member and spaced from the opposite point, and a jack screw carried by the jack shaft externally thereof and operatively extending through the nut.

6. A hitch jack adapted to be fixedly mounted on the front extension frame of a trailer or like vehicle, said jack comprising a mounting plate having a top wall, a guide extending through said wall and comprising a pair of aligned similar tubular members each having a base flange and said flanges being connected together through said wall, the outer end of each tubular member being restricted, a jack shaft extending through said guide and having guiding engagement for longitudinal movement with said restricted outer ends, said jack shaft comprising a tube having its wall longitudinally indented to form an outwardly facing longitudinal channel, a jack screw carried by the jack shaft and extending along said channel and within the cross-sectional dimensions of said jack shaft, and a nut fixed to one of the guide tube members and having keying engagement with the channel of the jack shaft, said jack screw extending through said nut.

7. A hitch jack adapted to be fixedly mounted on the front extension frame of a trailer or like vehicle, said jack comprising a mounting plate having a top wall, a guide extending through said wall and comprising a pair of aligned similar tubular members each having a base flange and said flanges being connected together through said wall, the outer end of each tubular member being restricted, a jack shaft extending through said guide and having guiding engagement for longitudinal movement with said restricted outer ends, said jack shaft comprising a tube having its wall longitudinally indented to form an outwardly facing longitudinal channel, a jack screw carried by the jack shaft and extending along said channel and within the cross-sectional dimensions of said jack shaft, a bracket connecting one end of the jack screw to the jack shaft, an end closure cap for the upper end of the jack shaft, an eccentric bearing in said cap for the other end of the jack screw, and a nut fixed to one of the guide tube members and having keying engagement with the channel of the jack shaft, said jack screw extending through said nut.

8. A hitch jack adapted to be fixedly mounted on the front extension frame of a trailer or like vehicle, said jack comprising a mounting plate having a top wall, a guide extending through said wall and comprising a pair of aligned similar tubular members each having a base flange and said flanges being connected together through said wall, the outer end of each tubular member being restricted, a jack shaft extending through said guide and having guiding engagement for longitudinal movement with said restricted outer ends, said jack shaft comprising a tube having its wall longitudinally indented to form an outwardly facing longitudinal channel, a jack screw carried by the jack shaft and extending along said channel and within the cross-sectional dimensions of said jack shaft, a bracket connecting one end of the jack screw to the jack shaft, an end closure cap for the upper end of the jack shaft, an eccentric bearing in said cap for the other end of the jack screw, a thrust bearing engaged with said cap for receiving the thrust of the jack screw, and a nut fixed to one of the guide tube members and having keying engagement with the channel of the jack shaft, said jack screw extending through said nut.

9. A hitch jack comprising a mounting plate, a tubular guide extending through said plate, a jack nut fixed within said guide and eccentric thereof, a jack shaft extending through the guide and engaged with the side of the guide opposite to the nut therein, a jack screw carried at its ends by the jack shaft and arranged alongside of the latter, said jack screw extending through said nut, and an operating handle on one end of the jack screw.

GEORGE M. DAVEY.
HAROLD HAUFLAIRE.

REFERENCES CITED

The following references are of record in the file of this patent:

UNITED STATES PATENTS

| Number | Name | Date |
| --- | --- | --- |
| 2,205,436 | Richards | June 25, 1940 |
| 2,230,534 | Elmer | Feb. 4, 1941 |
| 2,245,935 | Neighbour et al. | June 17, 1941 |
| 2,348,869 | Wagner | May 16, 1944 |

FOREIGN PATENTS

| Number | Country | Date |
| --- | --- | --- |
| 155,648 | Switzerland | June 30, 1932 |